Patented Mar. 15, 1949

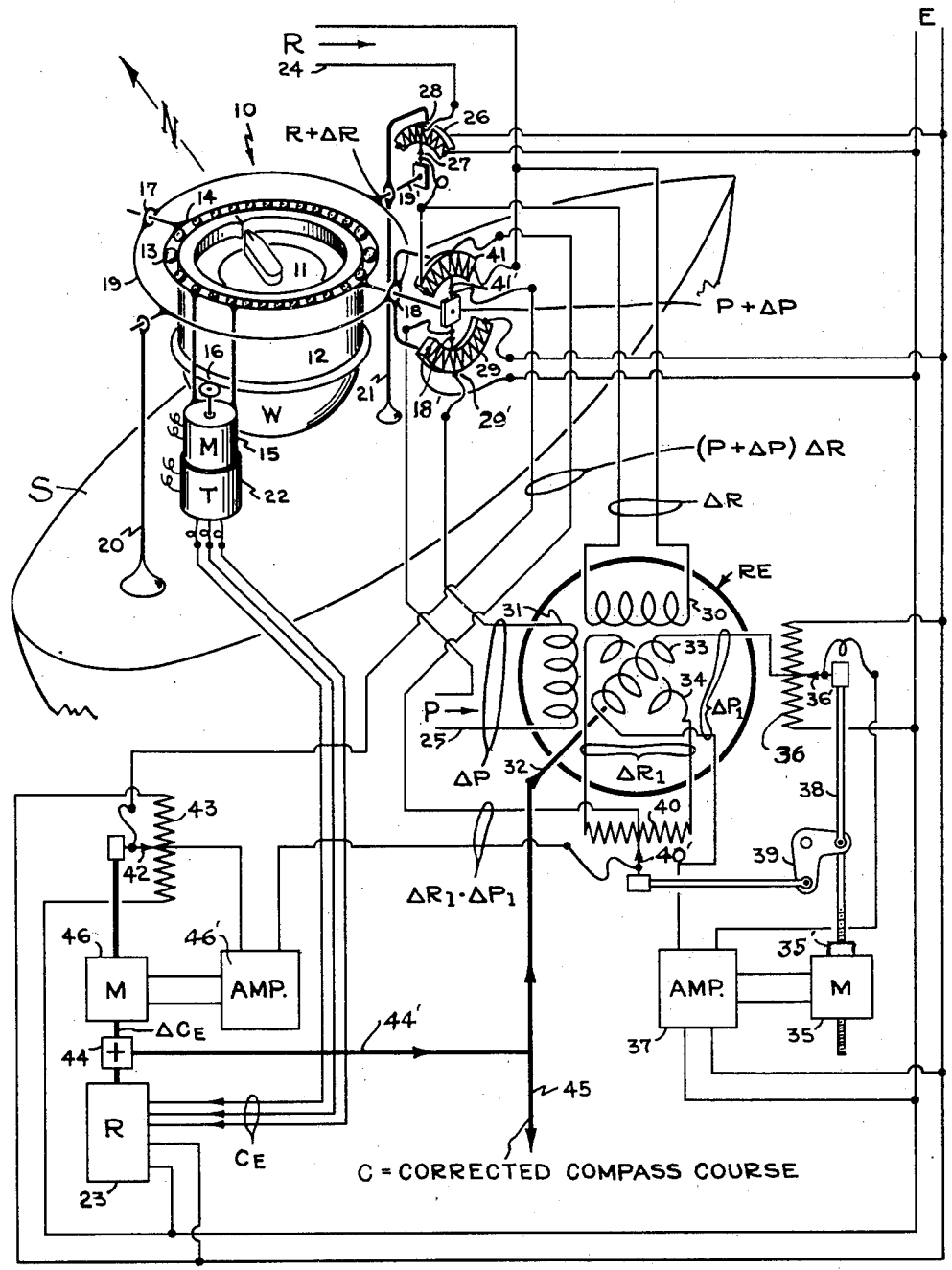

2,464,544

UNITED STATES PATENT OFFICE 2,464,544

MOTION TRANSMISSION SYSTEM

George Agins, Brooklyn, N. Y., assignor to Arma Corporation, Brooklyn, N. Y., a corporation of New York Application October 1, 1945, Serial No. 619,715

14 Claims. (Cl. 33—222)

This invention relates to motion transmission systems, and has particular reference to transmission of angular displacements such as compass course, to a follow-up indicator or repeater mounted at a remote point, although the invention is not limited to compass use.

The sensitive element of a compass is generally mounted in or on a follow-up member pendulously suspended in a gimbal system for universal movement, in order that its various remote repeater compass indications may be in the horizontal plane, as is the motion of the sensitive element. The pendulous mounting of a ship's compass is employed in order to obtain a rough stabilization which is sufficiently accurate for navigational use and the overswing frequently caused by the pendular nature of the mounting is suppressed by means of oil damping tanks located at the proper points on the gimbal suspension. However, during the rapid and evasive maneuvering tactics made necessary by modern naval warfare, the acceleration effects on the pendulous mounting of the compass, owing either or both to sudden changes in course or speed, introduces what is commonly known as the gimbal error in compasses of the repeater type, so that, though the acceleration error may be of short duration, it is the cause of many misses in gun fire. The principal reason for this gimbal error is the inherent inaccuracy in the usual gimbal suspension which is in effect a Hooke's joint, and hence is subject to the error of such devices when tilted at an angle. The alternatives are either to employ delicate stabilizing mechanism, which lacks the requisite ruggedness to preclude the misalignment which is likely to occur during rigorous operations and which renders it useless, or of correcting for the gimbal error, so that the compass will operate at all times with its normal accuracy and without requiring delicate precision stabilizing mechanism to that end.

In accordance with the invention, an angle transmitting mechanism especially adapted for ships compass course repeater system for correcting for the overswing of the pendulous follow-up member due to acceleration effects or the like is provided, including means for measuring the overswing in at least two vertical planes and multiplying the same to produce a first product, means for measuring and multiplying together the total overswing of one of the gimbal rings relatively to the deck and the overswing of the other gimbal ring relatively to the horizontal as a second product, mechanism for subtracting the first product from the second product to thereby obtain the approximate value of the error in the north indication of the follow-up member as it follows the north-seeking sensitive element of the compass and means for applying the output of said mechanism as the correction to the north indication of the follow-up member.

It will be seen that a very simple system for correcting the gimbal error in compasses of the repeater type is provided by this invention, whereby an ordinary pendulous compass utilized for navigation purposes may be rendered accurate so that its various repeater compasses may be used for the most accurate requirements of modern naval warfare, such as a basis for gun fire control calculations and the like.

For a more complete understanding of the invention, reference is had to the accompanying drawing which indicates schematically and diagrammatically the angle transmission system of this invention for correcting for the transmission through the Hooke's joint afforded by the gimbal suspension of the compass.

Referring to the drawing, numeral 10 designates the pertinent parts of a compass assembly whose sensitive element 11 may be a north-seeking gyroscope or a magnetic member, preferably floating in mercury or some other buoyant liquid contained in a pendulous cup or container 12 having the weight W. The cup 12 is supported for rotation in azimuth on the ball-bearing assembly 13 carried by the inner gimbal ring 14 and arranged to be rotated therein as the follow-up for the sensitive element 11, being driven by the follow-up motor 15 suspended from the gimbal ring 14 and rotating the cup 12 in its bearing 13 through gearing 16 interposed between it and motor 15, as indicated. The follow-up control for motor 15 is conventional and need not be described in connection with the present invention.

The gimbal ring 14 is supported for free oscillation in athwartships bearings 17 and 18 carried by the outer gimbal ring 19 in turn pivoted fore-and-aft in stanchions 20 and 21 mounted on the deck of the ship S or other unstable platform. The compass follow-up mechanism described is used to transmit compass headings to remote locations where compass repeaters are located. The transmission is effected electrically by a transmitter 22, usually self-synchronous, driven by the motor 15 and connected to one or more remote receivers 23 driving the repeater compass pointer or its equivalent indicator in accordance with the angular movements of the follow-up member 12, rather than by the sensitive element 11 directly.

The weight W on the follow-up member 12 renders the latter pendulous so that it remains on the average substantially horizontal, whereas the oscillations thereof are damped by liquid-containing tanks, not shown, but of conventional construction. When the ship S makes a sharp turn or changes speed suddenly, as during a rapid maneuver, the acceleration effect causes the weight W to respond so that the follow-up member 12 seeks the apparent vertical, which may not be the true vertical, so that it tilts. When this occurs, the follow-up member 12 although in a tilted plane is kept aligned with the sensitive element 11 in a horizontal plane and the follow-up motion of member 12 is transmitted to receiver 23 by transmitter 22 as a true follow-up of the movements of the sensitive element 11 relatively to the ship S, whereas this transmitted movement has imposed thereon an error due to the acceleration tilt of the gimbal suspension 14, 19, i. e., the inherent gimbal or Hooke's joint error. Accordingly, the various remote repeater compasses upon which gun fire control calculations are usually based do not correctly represent the bearing of the sensitive element 11 and errors in the gun fire calculations and consequent aiming of the guns result.

In the system of this invention, the error due to overswing of the gimbal rings 14, 19 out of the horizontal from any cause is calculated and applied continuously in the opposite sense to the erratic compass reading, whereby the gimbal error does not appear and the compass reading as repeated throughout on ship is correct at all times. The calculation is based on the following formulae:

$$\Delta C_E = (P + \Delta P)\Delta R - (\Delta P_1 \Delta R_1) \quad (1)$$

where $$\Delta R_1 = (\Delta P \sin C) + (\Delta R \cos C) \quad (2)$$

and $$\Delta P_1 = \Delta P \cos C - \Delta R \sin C \quad (3)$$

wherein

R = roll angle of the ship to the horizontal.
P = pitch angle of the ship to the horizontal.
$\Delta R$ = gimbal overswing angle from horizontal in roll.
$\Delta P$ = gimbal overswing angle from horizontal in pitch.
$\Delta R_1$ = gimbal overswing angle from horizontal about a north-south axis.
$\Delta P_1$ = gimbal overswing angle from horizontal about an east-west axis.
$C_E$ = compass reading from follow-up before correction.
$\Delta C_E$ = error in follow-up reading due to gimbal overswing angles, above; and
C = corrected compass reading from follow-up = $C_E \pm \Delta C_E$.

According to the formulae (1), (2) and (3), the error to be neutralized is a function of $\Delta R$ and $\Delta P$, the angular departure or overswing angles of the inner gimbal ring 14 from the horizontal, so that it is necessary to continuously measure these angles by comparison with a stable element. The majority of naval craft are equipped with some form of stable element, usually a vertical spin axis gyroscope from which the roll angle of the ship, R, and the pitch angle of the ship, P, are determined as electrical values which are supplied at 24 and 25, respectively. In the event that the ship is not equipped with a satisfactory stable element, a manually-operated horizon sight may be employed to supply the two angles R and P which are readily converted into electrical values by corresponding potentiometers or the like.

The electrical angle values of roll, R, and pitch, P, thus obtained, which indicate the horizontal from the deck of the ship S, are compared to the values of the actual gimbal angles $R + \Delta R$ and $P + \Delta P$ to the deck of the ship, as provided electrically by potentiometers 26 and 29 mounted on the gimbal axes. The symbols for the angles are also used in referring to the voltages proportional to the angles. Potentiometer 26 has a uniform winding which is supplied with the constant voltage and frequency alternating current from a suitable source E. The winding 26 is supported on the stanchion 21 whereas its brush 27 is carried by the extension 19' of one of the journals of gimbal ring 19 so as to move relatively to the winding of potentiometer 26 in accordance with relative movements between the deck of the ship and the gimbal ring 19 in roll. Thus, the relative position of the brush 27 along the winding of potentiometer 26 gives a voltage between brush 27 and midpoint 28 which is proportional to the angle $R + \Delta R$ that gimbal ring 19 makes with the deck of the ship S at any moment, and is of the proper polarity for port or starboard roll. This voltage, due to the series opposition connection described, is opposed to the roll voltage, R, supplied at 24, so that the resultant voltage $\Delta R$ is a measure of the overswing of gimbal ring 19 from the horizontal in roll.

Potentiometer 29 is carried by roll gimbal ring 19 and similarly has a uniform winding supplied with constant voltage and frequency alternating current from source E as shown. The brush 18' of potentiometer 29 is carried by one of the journals of pitch gimbal ring 14, so that the voltage between midpoint 29' and the brush 18' is proportional to the total swing $P + \Delta P$ of gimbal ring 14, or a voltage equal to $P + \Delta P$, which is algebraically combined with the pitch angle voltage, P, introduced at 25 to produce a voltage $\Delta P$ equal to the overswing of the pitch gimbal ring 14 from the horizontal. The voltages $\Delta R$, $\Delta P$, equal to the corresponding overswing angles of roll gimbal ring 19 and pitch gimbal ring 14, respectively, are impressed upon the stator windings 30 and 31, respectively, of electrical trigonometric resolver RE.

Resolver RE is composed of two stator windings 30 and 31 in space quadrature in whose joint field rotates the rotor comprising two windings 33 and 34 arranged in space quadrature on shaft 32. The input voltages supplied to the stator windings 30 and 31 induce in the rotor windings 33 and 34 corresponding voltages modified by trigonometric functions of the angle through which rotor windings 33 and 34 are rotated by shaft 32. The electro-mechanical resolver RE is now known to the art and does not constitute the invention claimed herein. The arrangement of the coils 30, 31, 33 and 34 of resolver RE is such that there is induced in rotor winding 33 a voltage proportional to $\Delta P \cos C - \Delta R \sin C = \Delta P_1$, whereas the voltage induced in rotor winding 34 is proportional to $\Delta p \sin C + \Delta R \cos C = \Delta R_1$, as indicated in the drawing.

Adverting to Formula 1, the angle $\Delta P_1$ must be multiplied by the value $\Delta R_1$ in order to provide the last term $\Delta P_1 \cdot \Delta R_1$ of the formula. Inasmuch as the values $\Delta P_1$ and $\Delta R_1$ are in the form of voltages, one of them must be converted to mechanical equivalent terms and that is accomplished by the brush 36' of the potentiometer 36 for the quantity P₁. The winding of potentiometer 36 is energized from alternating current source E and its brush 36' is moved along the winding by a threaded rod 38 advanced and retracted by a nut 35' rotated by rotor 35. Power for the motor is provided by the voltage $\Delta P_1$ from the rotor winding 33 of resolver RE connected to the midpoint of potentiometer 36 so as to oppose the voltage picked up by brush 36' of potentiometer 36, which is amplified at 37 and impressed upon the motor 35.

Accordingly, motor 35 will run until it moves brush 36' of potentiometer 36 to a point on the winding 36 such that the voltage applied to amplifier 37 becomes zero, whereupon motor 35 deenergizes itself. Shaft 38 will then have been moved to a position proportional to the electrical value $\Delta P_1$ and that position is the mechanical value $\Delta P_1$. One arm of a bell-crank 39 is connected to rod 38 and its other arm is connected to brush 40' of potentiometer 40, whose winding is energized in accordance with $\Delta R_1$ voltage from rotor winding 34 of resolver RE. Potentiometer 40 is accordingly a multiplying potentiometer which produces a voltage equal to the product $\Delta R_1 \cdot \Delta P_1$.

The remaining term of Formula 1, which is in the form $(P+\Delta P)\Delta R$, remains to be determined, of which the value $P+\Delta P$ is provided as an angle to the potentiometer 41 whose brush 41' is mechanically connected to brush 18' of potentiometer 29 so as to assume the same angle relatively to the deck of ship S. However, unlike potentiometers 26 and 29, potentiometer 41 is not supplied with constant voltage, but by varying $\Delta R$ voltage as shown, so that the output voltage of potentiometer 41, that is, the voltage between the brush 41' and the midpoint of the winding 41, is proportional to $(P+\Delta P)\Delta R$, the remaining term of Formula 1. As indicated in the drawing, this voltage is supplied to amplifier 46' in series with a voltage from brush 42 of potentiometer 43.

Since the output of potentiometer 43 is opposed by the voltage equal to $\Delta R_1 \cdot \Delta P_1$, as well as the voltage $(P+\Delta P)\Delta R$ from potentiometer 41, the resultant value impressed on the motor 46 is equal to $(P+\Delta P)\Delta R - \Delta R_1 \cdot \Delta P_1$, which is equivalent to gimbal error $\Delta C_E$, according to Formula 1. The motor 46 accordingly reproduces this error voltage as a mechanical displacement to actuate the brush 42 of potentiometer 43 so as to develop that mechanical value upon deenergization of itself. Motor 46 drives one side of a mechanical differential 44 which algebraically combines the gimbal error with the erratic compass course fed from compass repeater receiver 23 to the other side of the differential 44. The output of the differential 44 is connected by shaft 44' to the shaft 32 of the rotor of resolver RE and to the output shaft 45, as, C, corrected compass course in the horizontal plane. In this way the Hooke's joint error inherent in the gimbal suspension of the compass is continuously corrected in the repeater compasses so that they accurately repeat true compass course at all times.

The operation of the motion transmission system of this invention has been described as the description of the schematic drawing of the system progressed, and is readily understood from the foregoing. The system thus described and illustrated, although a preferred embodiment, may be realized in several equivalent or alternative forms, and it is to be understood that the invention is not limited thereby except as may be determined by the scope of the appended claims.

I claim:
1. In a system for transmitting rotary motion from a first member to a second member at an angle thereto through a Hooke's joint, the combination of mechanism actuated jointly by said first member and said Hooke's joint, and means interposed between said mechanism and said second member and actuated by said mechanism for modifying the rotary motion of said second member to accord with the motion of said first member at said angle.

2. In a system for transmitting rotary motion from a first member to a second member at an angle thereto through a Hooke's joint, the combination of mechanism jointly actuated by said input member and said Hooke's joint, a rotary output element driven by said mechanism, a differential, and several operative connections between said second member and said element and the corresponding inputs of said differential, whereby the output of said differential substantially correctly reproduces the rotary motion of said first member at said angle.

3. In a system for transmitting rotary motion from a first member to a second member at an angle thereto through a Hooke's joint, the combination of means responsive to the degree of angularity between said members, mechanism jointly actuated by said last means and said first member, a rotary output element driven by said mechanism, a differential, and several operative connections between said second member and said element and the corresponding inputs of said differential, whereby the output of said differential substantially correctly reproduces the rotary motion of said first member at said angle.

4. In a system for transmitting rotary motion from a first member to a second member at an angle thereto through a Hooke's joint, the combination of two means each responsive to the degree of angularity between said members in two corresponding intersecting planes, means jointly actuated by said two responsive means, mechanism jointly actuated by said last means and said first member, a rotary output element driven by said mechanism, a differential, and several operative connections between said second member and said element and the corresponding inputs of said differential, whereby the output of said differential substantially correctly reproduces the rotary motion of said first member at said angle.

5. In a system for transmitting rotary motion from a first member to a second member at an angle thereto through a Hooke's joint, the combination of two means responsive to the degree of angularity between said members in two corresponding planes intersecting in the axis of one of said members, means jointly actuated by said two responsive means, mechanism jointly actuated by said last means and said first member, a rotary output element driven by said mechanism, a differential, and several operative connections between said second member and said element and the corresponding inputs of said differential, whereby the output of said differential substantially correctly reproduces the rotary motion of said first member at said angle.

6. In a system for transmitting rotary motion from a first member to a second member at an angle thereto through a Hooke's joint, the combination of two means responsive to the degree of angularity between said members in two corresponding planes intersecting the axis of said first member, means jointly actuated by said two responsive means, mechanism jointly actuated by said last means and said first member, a rotary output element driven by said mechanism, a differential, and several operative connections between said second member and said element and the corresponding inputs of said differential, whereby the output of said differential substantially correctly reproduces the rotary motion of said first member at said angle.

7. In a system for transmitting rotary motion from a first member to a second member at an angle thereto through a Hooke's joint, the combination of first means responsive to the degree of angularity between said members in a plane including the axis of one of said members, second means responsive to the degree of angularity between said members in a plane including said axis and at an angle to said first plane, mechanism jointly actuated by said first and second means for modifying the angle outputs of the same, third means for combining the outputs of said first and second means, fourth means for combining the two outputs of said mechanism, and a differential jointly actuated by said last two means and said second member, whereby the output of said differential substantially correctly reproduces the rotary motion of said first member at said angle.

8. In a system for transmitting rotary motion from a first member to a second member at an angle thereto through a Hooke's joint, the combination of first means responsive to the degree of angularity between said members in a plane including the axis of said first member, second means responsive to the degree of angularity between said members in a plane including said axis and at an angle to said first plane, mechanism jointly actuated by said first and second means for modifying the angle outputs of the same, third means for combining the outputs of said first and second means, means for combining the two outputs of said mechanism, and a differential jointly actuated by said last two means and said second member, whereby the output of said differential substantially correctly reproduces the rotary motion of said first member at said angle.

9. In a system for transmitting rotary motion from a first member to a second member at an angle thereto through a Hooke's joint, the combination of electrical means responsive to the degree of angularity between said members for developing a voltage proportional thereto, mechanism jointly actuated by said last means and said first member for developing a voltage in accordance with the input voltages, an electrical motive element driven by said mechanism, a differential, and several operative connections between said second member and said element and the corresponding inputs of said differential, whereby the output of said differential substantially correctly reproduces the rotary motion of said first member at said angle 10. In a system for transmitting rotary motion from a first member to a second member at an angle thereto through a Hooke's joint, the combination of electrical means responsive to the degree of angularity between said members in a plane including the axis of one of said members for developing a voltage proportional thereto, electrical means responsive to the degree of angularity between said members in a plane including said one axis and at an angle to said first plane for developing voltage proportional thereto, electro-mechanical mechanism jointly energized by said means for modifying the angle output voltages of the same and having two corresponding output voltages, means for combining the outputs of said first means, means for combining the said two outputs of said electro-mechanical mechanism, electrical motive means jointly energized in accordance with the outputs of said last two means, a differential jointly actuated by said motive means and said member, and operative connections between said differential output and said electro-mechanical mechanism whereby the output of said differential substantially correctly reproduces the rotary motion of said first member at said angle.

11. In a system for reproducing the movements of the sensitive element of a compass in a substantially horizontal plane and including a follow-up member therefor mounted on a gimbal ring suspension on an unstable platform and driving a repeater, the combination of means responsive to any overswing of said follow-up member for converting said overswing angle into equivalent angles in the north-south and east-west planes, and a differential actuated severally from said means and repeater, whereby the modified repeater movements of said differential output substantially correctly reproduces the motion of said compass sensitive element.

12. In a system for reproducing the movements of the sensitive element of a compass in a substantially horizontal plane and including a separate stable element, a follow-up member for said sensitive element mounted on a gimbal ring suspension on an unstable platform and driving a repeater, the combination of means actuated in accordance with the movements of said gimbal rings in coordinate vertical planes relatively to said stable element for developing voltages proportional to said movements, a transformer means having primary windings energized by said voltages and secondary windings for combining said voltages, motive means energized jointly in accordance with the voltage output of the secondary windings of said last means and the product of the gimbal overswing angle in one of said coordinate planes by the total gimbal swing angle in the other of said coordinate planes, a differential, and several operative connections between the inputs of said differential and said motive means and repeater, whereby the modified repeater movements of said differential output substantially correctly reproduce the motion of said compass sensitive element.

13. In a system for reproducing the movements of the sensitive element of a compass in a substantially horizontal plane and including a follow-up member therefor mounted on a gimbal ring suspension on an unstable platform and driving a repeater, the combination of means responsive to the degree of any overswing of said follow-up member in the vertical plane of the journals of one gimbal ring for developing a voltage proportional thereto, means responsive to the degree of overswing of said follow-up member in the vertical plane of the journals of the other gimbal ring for developing a voltage proportional thereto, electro-mechanical mechanism having stator windings energized jointly by both said means and rotor windings for converting said voltages into voltages corresponding to the overswings of said member in the north-south and east-west planes, motive means, means actuated in accordance with the product of the output voltages of said rotor windings and the product of the gimbal overswing angle in roll by the total gimbal swing angle in pitch for energizing said motive means, a differential, operative connections between one input of said differential and said motive means, and operative connections between the other input of said differential and said repeater, whereby the output of said differential substantially correctly reproduces the motion of said compass sensitive element, and driving connections between the output of said differential at said rotor windings.

14. In a system for reproducing the movements of the sensitive element of a compass in a substantially horizontal plane and including a follow-up member therefor mounted on a gimbal ring suspension on an unstable platform and driving a repeater, the combination of means responsive to the degree of any overswing of said follow-up member in the vertical plane of the journals of one gimbal ring for developing a voltage proportional thereto, means responsive to the degree of overswing of said follow-up member in the vertical plane of the journals of the other gimbal ring for developing a voltage proportional thereto, a transformer having primary windings energized respectively by said two means and secondary windings, for converting said voltages into voltages corresponding to the overswings of said member in the north-south and east-west planes, motive means, means actuated in accordance with the product of the output voltages of said secondary windings and the product of the gimbal overswing angle in roll by the total gimbal swing angle in pitch for energizing said motive means, a differential, operative connections between one input of said differential and said motive means, and operative connections between the other input of said differential and said repeater, whereby the output of said differential substantially correctly reproduces the rotary motion of said compass sensitive element.

GEORGE AGINS.

No references cited.